United States Patent [19]

Lew et al.

[11] Patent Number: 5,248,246

[45] Date of Patent: Sep. 28, 1993

[54] ORBITING BALL METER-MOTOR-PUMP

[76] Inventors: Hyok S. Lew; Yon S. Lew, both of 7890 Oak St., Arvada, Colo. 80005

[21] Appl. No.: 840,505

[22] Filed: Feb. 24, 1992

[51] Int. Cl.$^5$ .......................... F01C 1/00; G01F 3/08
[52] U.S. Cl. ........................ 418/4; 418/225; 73/255; 417/420
[58] Field of Search ............... 418/4, 35, 171, 225; 73/255

[56] References Cited

U.S. PATENT DOCUMENTS

| | | | |
|---|---|---|---|
| 981,660 | 1/1911 | Kinney | 73/255 |
| 3,447,476 | 6/1969 | Farris | 418/225 |
| 4,574,644 | 3/1986 | Lew et al. | 417/420 |
| 5,027,654 | 7/1991 | Bergamini | 418/225 X |

*Primary Examiner*—Richard E. Gluck

[57] ABSTRACT

A positive displacement fluid handling apparatus comprises a body including a closed loop tunnel with a circular cross section, laid out in an oblong geometry with two substantially semicircular sections of the tunnel respectively disposed at the two extremities thereof and respectively open to two ports, and a plurality of spherical balls with diameter closely matched to the diameter of the circular cross section of the closed loop tunnel disposed within the closed loop tunnel in a freely movable arrangement, wherein a star wheel disposed in conjunction with one of the two substantially semicircular sections of the tunnel in a rotatable arrangement about the axis of rotation disposed in a parallel and offset relationship to the central axis of radius of the substantially semicircular section of the tunnel feeds the spherical balls past the inlet port open to that substantially semicircular section of the tunnel.

20 Claims, 1 Drawing Sheet

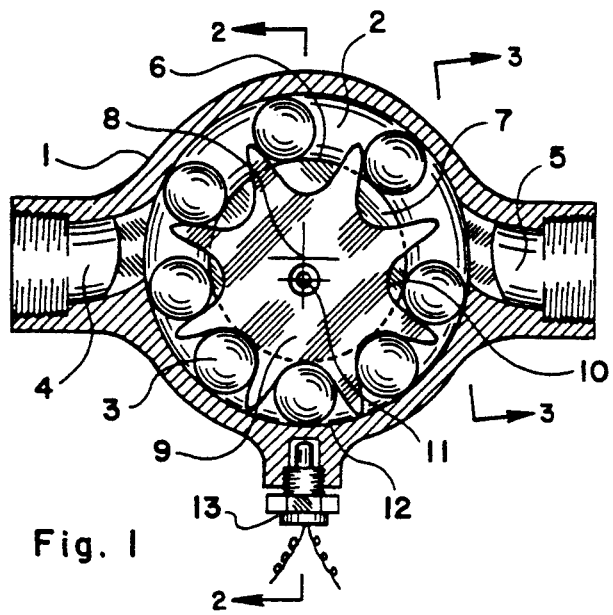
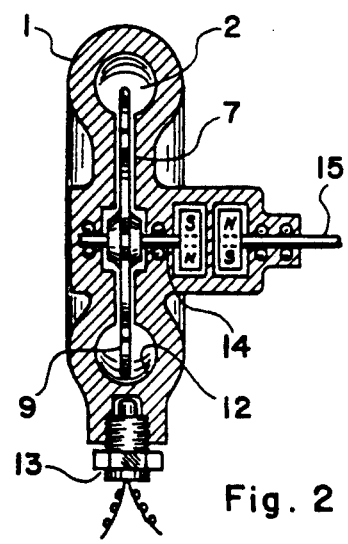
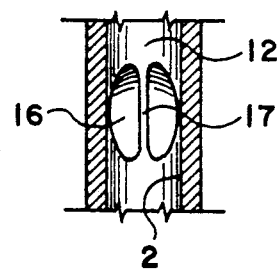
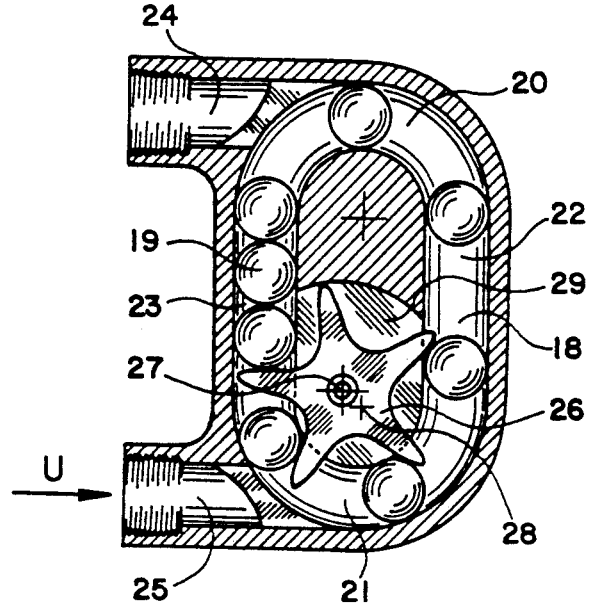
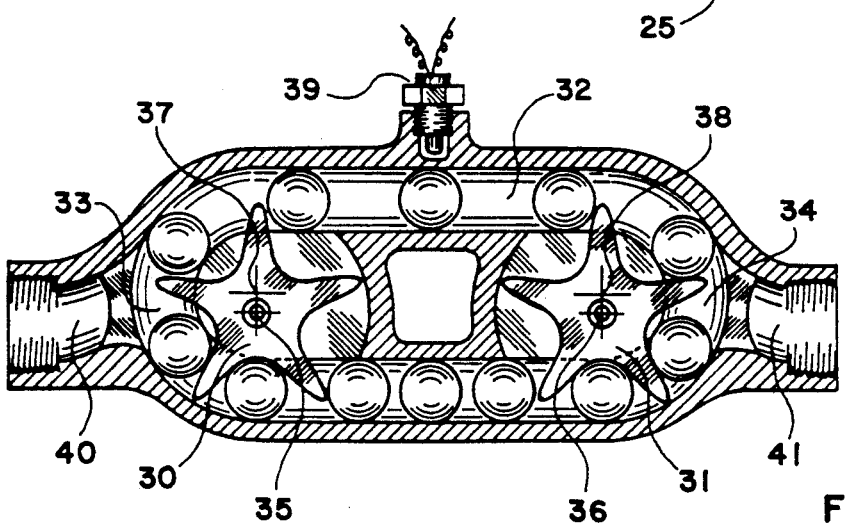

5,248,246

ORBITING BALL METER-MOTOR-PUMP

FIELD OF INVENTION

The present invention relates to a positive displacement fluid handling apparatus that can be used as a flowmeter, a pneumatic motor, or a pump.

BACKGROUND OF INVENTION

The concept of employing a plurality of spheres disposed within a toroidal cavity connecting a flow inlet to a flow outlet, wherein the spheres undergo an orbiting movement through the toroidal cavity with cross section closely matched to the dimension of the spheres, is a very neat idea that can bring forth an elegant positive displacement fluid handling device. The problem with this concept is that none of the existing arts employing the principles of the spheres orbiting through the toroidal cavity works in reality, which nonworking arts includes an earlier invention by one of these inventors (U.S. Pat. No. 4,574,644). When only one sphere is included in the toroidal cavity, this single sphere orbits as long as the velocity of fluid flowing through the toroidal cavity is high enough. However, when the velocity of fluid is low, the single sphere stops orbiting. At best, this embodiment employing a single sphere in a toroidal cavity works as a flow indicator for medium to high flow rates, while it serves little usefulness as a flowmeter or as any other form of the positive displacement fluid handling device. Chagrined by one of these inventor's earlier invention (U.S. Pat. No. 4,574,644) which was nothing more than a helter-skelter Rube Goldberg gadget, this inventor has been brain-storming for the past five years and has finally succeeded in inventing an apparatus that brings forth a very outstanding positive displacement flowmeter capable of measuring very low flow rates of fluid, which apparatus can also provide a motor or pump filling certain niche usages.

SUMMARY OF INVENTION

The primary object of the present invention is to provide a positive displacement fluid handling apparatus that comprises a plurality of spheres disposed within a toroidal cavity with a circular cross section closely matched to the spheres, which toroidal cavity connects a flow inlet to a flow outlet, wherein the body providing the toroidal cavity has a planar circular cavity disposed on the middle plane of the toroidal cavity perpendicular to the axis of rotation generating the toroidal cavity, which circular planar cavity is disposed in an eccentric relationship to the axis of rotation generating the toroidal cavity, in which planar circular cavity a star wheel with a plurality of peripheral recesses each large enough to accommodate a single sphere is disposed rotatably about the central axis of the star wheel offset from the axis of the rotation generating the toroidal cavity in a direction lateral to a line connecting the flow inlet and flow outlet.

Another object of the present invention is to provide a positive displacement fluid handling device comprising a plurality of spheres disposed within a closed loop tunnel with a circular cross section closely matched to the spheres, which closed loop tunnel is composed of two half toroidal cavities respectively connected to a flow inlet and flow outlet, and connected to one another by a pair of rectilinear tunnels, wherein one extremity of the closed loop tunnel includes the star wheel described in conjunction with the above-presented primary object of the present invention.

A further object of the present invention is to provide a modified version of the embodiment described in the above-presented another object of the present invention, which modified version now includes two star wheels respectively disposed at the two extremities of the closed loop tunnel.

These and other objects of the present invention will become clear as the description thereof progresses.

DESCRIPTION OF FIGURES

The present invention may be described with a greater clarity and specificity by referring to the following figures.

FIG. 1 illustrates a cross section of an embodiment of the present invention, that comprises a plurality of spheres disposed within a toroidal cavity in an orbitable arrangement.

FIG. 2 illustrates another cross section of the embodiment shown in FIG. 1.

FIG. 3 illustrates a further cross section of the embodiment shown in FIG. 1.

FIG. 4 illustrates a cross section of another embodiment of the present invention that comprises a plurality of spheres disposed within a closed loop tunnel of an oblong geometry in an orbitable arrangement.

FIG. 5 illustrates a cross section of a further embodiment of the present invention, that comprises a plurality of spheres disposed within a closed loop tunnel of an oblong geometry in an orbitable arrangement.

DESCRIPTION OF ILLUSTRATED EMBODIMENTS

In FIG. 1 there is illustrated a cross section of the quasi-positive displacement fluid handling device of the present invention, that comprises a body 1 including a closed loop tunnel 2 with a circular cross section, that includes a plurality of spherical balls 3 disposed in an orbitable arrangement, wherein the diameter of the circular cross section of the tunnel 2 and diameter of the spherical ball 3 are closely matched to one another. The two diametrically opposite portions of the closed loop tunnel 2 are respectively open to a first port 4 and a second port 5. The central portion 6 of the body 1 surrounded by the closed loop tunnel 2 inlcudes a thin planar cavity 7 disposed on the middle plane of the closed loop tunnel 2 perpendicular to the central axis 8 of the closed loop tunnel 2. A thin planar star wheel 9 including a plurality of peripheral recesses 10 is disposed in the planar cavity 7 rotatably about an axis of rotation 11 coinciding with the central axis of the star wheel 9, that is disposed in a parallel and offset arrangement with respect to the central axis 8 of the closed loop tunnel 2. It is generally desirable that the axis of rotation 11 should be offset from the central axis 8 at least in a direction lateral to a line connecting the central axes of the two ports 4 and 5. The star wheel 9 should be of an axisymmetric geometry about the axis of rotation, wherein the recesses 10 must be large enough to accommodate at least one of the spherical balls 3. The outermost periphery of the star wheel 9 should extend more or less all the way to the outer circumferential wall 12 of the tunnel 2 at a section where the distance between the axis of rotation 11 and the tunnel is the minimum, and terminates at the middle of the cross section of the tunnel 2 at a section where the distance between the axis of rotation 11 and the tunnel 2 is the maximum. The geometry of the closed loop tunnel may be a circle coaxial to the central axis 8 or an ellipse with the major axis disposed parallel or perpendicular to a line connecting the central axes of the two ports 4 and 5. A rotary motion sensor 13 detecting the tips of the spokes of the star wheel 9 or the spherical balls 3 passing thereby counts the frequency thereof passing by as a measure of the fluid flow moving through the apparatus, which rotary motion sensor may be capacitive, inductive, magnetic coil or optical type sensors detecting the movements of the targets passing by. In the positive displacement apparatus such as the device taught by the present invention, the motion of the fluid flowing through the device and the orbiting motion of the spherical balls are positively correlated to one another, and consequently, the volume flow rate of the fluid can be determined as a function of the frequency of the spherical balls or the teeth of the star wheel passing by the motion sensor, or as a function of the rotating speed of the star wheel by using an empirically determined mathematical relationship therebetween.

In FIG. 2 there is illustrated another cross section of the embodiment shown in FIG. 1, which cross section is taken along plane 2—2 as shown in FIG. 1. The axle 14 of the star wheel 9 is rotatably supported by the body 1 by means of a plurality of roller bearings. A magnetic rotary motion coupling including a pair of bar magnets respectively mounted on the axle 14 of the star wheel 9 and the r.p.m. output shaft 15 may replace the rotary motion sensor 13, as a mechanical rotary motion counter can be coupled to the r.p.m. output shaft 15. As the volume flow rate of the fluid moving through the device is positively correlated to the frequency of the spherical balls orbiting through the closed loop tunnel, that is in turn correlated to the rotating speed of the star wheel, the volume flow rate of the fluid moving through the device can be determined as a function of the rotating speed of the r.p.m. output shaft that rotates at the same rotating speed as the star wheel. It is readily recognized that, in an alternative design, the axle or shaft 14 of the star wheel 9 can be extended through and out of the body 1 so that torque or power can be transmitted from and to the star wheel. It should be also understood that the thinner the thickness of the planar star wheel 9 is, and the narrower the width of the planar cavity 7 receiving the planar star wheel 9 is, the more accurate and reliable volume flow measurement the device provides. In general, the thickness of the planar star wheel 9 must be substantially smaller then the diameter of the circular cross section of the closed loop tunnel 2, and the planar cavity 7 must receive the planar star wheel 9 in a close tolerance relationship.

In FIG. 3 there is illustrated a further cross section of the embodiment shown in FIG. 1, which cross section is taken along plane 3—3 as shown in FIG. 1. The opening 16 through the outer circumferential wall 12 of the tunnel 2 connecting the tunnel 2 to the second port 5 has a planar divider 17 with inner edge coinciding with the outer circumferential wall 12 of the tunnel 2, that guides the spherical balls 3 in the orbiting motion thereof. An opening of construction similar to that shown in FIG. 2 connects the first port 4 to the tunnel 2.

Upon examining the structural arangement of the positive displacement fluid handling apparatus of the present invention illustrated in FIGS. 1, 2 and 3, it can be readily recognized that the fluid flow entering through one and exiting through the other of two ports 4 and 5 will generate the combination of the orbiting motion of the spherical balls 3 and the rotating motion of the star wheel 9, as the differential pressure of the fluid across the spherical balls 3 produces an unbalanced torque on the star wheel 9 about the axis of rotation 11 due to the offset arrangement of the axis of rotation 11 with respect to the central axis 8 of the closed loop tunnel 2. As a consequence, the fluid flow moving through the upper half portion of the closed loop tunnel 2 illustrated in FIG. 1, that is the portion diametrically opposite to the rotary motion sensor 13, will generate the orbiting motion of the spherical balls 3 and the rotating motion of the star wheel 9 at a rotary speed that is directly proportional to the volume rate of the fluid flow, which has to be so because the fluid cannot flow without pushing the spherical balls 3 through the upper half portion of the closed loop tunnel 2. It is also readily recognized that a forced fluid flow through the apparatus will generate a torque on the star wheel 9, which torque can be taken off through an extension of the axle 14 of the star wheel 9, and a forced rotation of the star wheel 9 by a power drive connected to an extension of the axle 14 will generate pumping of the fluid. In other words, the apparatus shown in FIGS. 1, 2 and 3 can be used as a flowmeter or motor or pump. The apparatus shown in FIG. 1, 2 and 3 is categorized as a quasi-positive displacement apparatus because there will be a small amount of fluid leak across each spherical ball 3 through the gaps associated with the thin planar cavity 7 receiving the star wheel 9. It should be understood that the two ports 4 and 5 may disposed in an arrangement providing an U-shaped flow passage as exemplified by the arrangement shown in FIG. 4.

In FIG. 4 there is illustrated a cross section of another embodiment of the present invention, that is a truly positive displacement fluid handling apparatus. This embodiment has a closed loop tunnel 18 with a circular cross section, that includes a plurality of spherical balls 19 with size closely matched to the cross sectional dimension of the tunnel 18 in an orbitable arrangement. The closed loop tunnel 18 comprises a pair of semicircular sections 20 and 21 of the tunnel connected to one another by a pair of parallel rectilinear sections 22 and 23 of the tunnel, wherein two ports 24 and 25 are respectively open to the two semicircular sections 20 and 21 of the tunnel in a tangential arrangement. A star wheel 26 of the construction and function described in conjunction with FIG. 1 is disposed at one extremity of the closed loop tunnel 18 in conjunction with the semicircular section 21 of the tunnel, wherein the axis of rotation 27 of the star wheel 26 is disposed in an offset relationship to the center of radius 28 of the semicircular section 21 of the tunnel. It should be noticed that the direction of offset between the axis of rotation 27 and the center of radius 28 is at a 45 degree angle with respect to a line connecting the centers of radius of the two semicircular sections 20 and 21 of the tunnel, which angle of offset may be changed to 90 degrees or 0 degree, or any other angle therebetween in an alternative arrangement. It should be noticed that there is no leak of fluid across the spherical balls located in one half section of the closed loop tunnel 18 adjacent to the port 24 as that half section of the tunnel is free of the planar cavity 29 receiving the star wheel 26. The particular embodiment shown in FIG. 4 operates best in the upright position as shown in FIG. 4, wherein the fluid enters through the lower port 25 and exits through the upper port 24. However, this particular embodiment also works well in other positions as long as there are enough balls 19 in the closed loop tunnel 18 whereby the star wheel 26 pushes the spherical ball by the opening of the inlet port into the closed loop tunnel 18. It should be understood that the arrangement of the two ports 24 and 25 may be changed from the U-shaped flow passage configuration shown in the particular illustrative embodiment to the in-line flow passage arrangement exemplified by the arrangement shown in FIG. 5 or other arrangement intermediate the U-shaped and in-line flow passage configuration.

In FIG. 5 there is illustrated another embodiment of the positive displacement fluid handling apparatus of the present invention, that is a modified version of the embodiment shown in FIG. 4. In this embodiment, a pair of star wheels 30 and 31 are respectively disposed at the two extremities of the closed loop tunnel 32 in conjunction with the two semicurcular sections 33 and 34 of the tunnel, wherein the axes 35 and 36 of rotation of the two star wheels 30 and 31 are offset from the radii of centers 37 and 38 of the two semicircular sections 33 and 34, respectively. In order to be a truly positive displacement apparatus, there must be a sufficient length of the rectilinear sections of the tunnel intermediate the two semicircular sections 33 and 34 of the tunnel, and a sufficient number of spherical balls disposed therein, whereby at least one spherical ball travels at all instances through each of the two rectilinear sections of the tunnel free of the planar cavities receiving the star wheels 30 and 31. The motion sensor 39 counts the frequency of the spherical balls passing by as a measure of flow rate of the fluid. Although it is not necessary in most cases of application, the rotating motions of the two star wheels may be coupled to one another by gearing, roller chain, or timing belt in such a way that they rotate at the same speed in the same direction. The arrangement of the two ports 40 and 41 may be changed from the in-line configuration to the U-shaped flow passage configuration as exemplified by FIG. 4 or to other intermediate configurations.

While the principles of the present invention have now been made clear by the illustrative embodiment, there will be many modifications of the structures, arrangements, proportions, elements and materials, which are obvious to those skilled in the art and particularly adapted to the specific working environments and operating conditions in the practice of the invention without departing from those principles. It is not desired to limit the invention to the particular illustrative embodiments shown and described, and consequently, all suitable modifications and equivalents may be regarded as falling within the scope of the invention as defined by the claims which follow.

The embodiments of the invention, in which an exclusive property or priviledge is claimed, are defined as follows:

1. An apparatus for executing a function related to fluid flow comprising in combination:
   a) a body including a closed loop tunnel having a circular cross section, and a thin planar cavity having a width substantially smaller than diameter of the circular cross section of the closed loop tunnel disposed in a portion of the body surrounded by the closed loop tunnel on a center plane defined by central axis of the closed loop tunnel, said central axis being a line passing through center of every circular cross section of the closed loop tunnel; wherein said thin planar cavity extends through inner portion of circular cylindrical wall of at least a portion of the closed loop tunnel;
   b) a thin planar star wheel having a thickness substantially smaller than the diameter of the circular cross section of the closed loop tunnel and including a plurality of peripheral recesses disposed in said thin planar cavity and supported by the body rotatably about central axis of the thin planar star wheel disposed in a parallel and offset relationship with respect to a center of radius of the central axis of said at least a portion of the closed loop tunnel; wherein periphery of the thin planar star wheel extends substantially across the circular cross section of a first portion of said at least a portion of the closed loop tunnel, and extends substantially into the circular cross section of a second portion of said at least a portion of the closed loop tunnel;
   c) a plurality of spherical balls with diameter closely matched to the diameter of the circular cross section of the closed loop tunnel disposed within the closed loop tunnel in a freely movable relationship; wherein each of the plurality of peripheral recesses included in the thin planar star wheel is large enough to accommodate at least one of the plurality of spherical balls; and
   d) a first port open to one section of the closed loop tunnel located on one side of a hypothetical plane including the central axis of the thin planar star wheel and intersecting with said a first and second portions of said at least a portion of the closed loop tunnel, and a second port open to the other section of the closed loop tunnel located on the other side of said hypothetical plane opposite to said one side.

2. An apparatus as defined in claim 1 wherein said combination includes means for measuring frequency of the plurality of spherical balls traveling across a cross section of the closed loop tunnel as a measure of flow rate of fluid moving through the apparatus.

3. An apparatus as defined in claim 1 wherein said combination includes means for measuring rotating speed of the thin planar star wheel as a measure of flow rate of fluid moving through the apparatus.

4. An apparatus as defined in claim 1 wherein said combination includes a power shaft transmitting rotating motion from and to the thin planar star wheel.

5. An apparatus as defined in claim 1 wherein the closed loop tunnel has an oblong geometry, and the thin planar cavity is confined to one extremity of the portion of the body surrounded by the closed loop tunnel of oblong geometry and said at least a portion of the closed loop tunnel receiving the periphery of the thin planar star wheel adjoins said one extremity of the portion of the body surrounded by the closed loop tunnel of oblong geometry; and the other portion of the closed loop tunnel of oblong geometry extending from said at least a portion of the closed loop tunnel has circular cylindrical wall free of any crevices open to the thin planar cavity.

6. An apparatus as defined in claim 5 wherein said combination includes means for measuring frequency of the plurality of spherical balls traveling across a cross section of the closed loop tunnel of oblong geometry as a measure of flow rate of fluid moving through the apparatus.

7. An apparatus as defined in claim 5 wherein said combination includes means for measuring rotating speed of the thin planar star wheel as a measure of flow rate of fluid moving through the apparatus.

8. An apparatus as defined in claim 5 wherein said combination includes a power shaft transmitting rotating motion from and to the thin planar star wheel.

9. An apparatus as defined in claim 1 wherein the closed loop tunnel has an oblong geometry, and the thin planar cavity is confined to one extremity of the portion of the body surrounded by the closed loop tunnel of oblong geometry and said at least a portion of the closed loop tunnel receiving the periphery of the thin planar star wheel adjoins said one extremity of the portion of the body surrounded by the closed loop tunnel of oblong geometry; and said combination includes another thin planar star wheel rotatably disposed in another thin planar cavity confined to the other extremity of the portion of the body surrounded by the closed loop tunnel of oblong geometry opposite to said one extremity in a mirror image relationship to said the thin planar star wheel about a hypothetical plane located intermediate said the and another thin planar star wheel; wherein a midportion of the closed loop tunnel of oblong geometry intermediate said the and another thin planar cavity has circular cylindrical wall free of any crevices open to at least one of said the and another thin planar cavity.

10. An apparatus as defined in claim 9 wherein said combination includes means for measuring frequency of the plurality of spherical balls traveling across a cross section of the closed loop tunnel of oblong geometry as a measure of flow rate of fluid moving through the apparatus.

11. An apparatus as defined in claim 9 wherein said combination includes means for measuring rotating speed of at least one of said the and another thin planar star wheel as a measure of flow rate of fluid moving through the apparatus.

12. An apparatus as defined in claim 9 wherein said combination includes at least one power shaft transmitting rotating motion from and to one of said the and another thin planar star wheel.

13. An apparatus for executing a function related to fluid flow comprising in combination:
   a) a body including a closed loop tunnel of an oblong geometry having a circular cross section, and a planar cavity disposed at one extremity of a portion of the body surrounded by the closed loop tunnel of oblong geometry in a parallel and symmetric relationship to a center plane defined by central axis of the closed loop tunnel of oblong geometry, said central axis being a line passing through center of every circular cross section of the closed loop tunnel of oblong geometry; wherein said planar cavity extends through inner portion of circular cylindrical wall of at least a portion of the closed loop tunnel adjoining said one extremity of the portion of the body surrounded by the closed loop tunnel of oblong geometry, and the other portion of the closed loop tunnel extending from said at least a portion has circular cylindrical wall free of any crevices open to the planar cavity;
   b) a planar star wheel including a plurality of peripheral recesses disposed in said planar cavity and supported by the body rotatably about central axis of the planar star wheel disposed in a parallel and offset relationship with respect to a center of radius of the central axis of said at least a portion of the closed loop tunnel of oblong geometry; wherein periphery of the planar star wheel extends substantially across the circular cross section of a first portion of said at least a portion of the closed loop tunnel of oblong geometry, and extends substantially into the circular cross section of a second portion of said at least a portion of the closed loop tunnel of oblong geometry;
   c) a plurality of spherical balls with diameter closely matched to diameter of the circular cross section of the closed loop tunnel of oblong geometry disposed within the closed loop tunnel of oblong geometry in a freely movable relationship; wherein each of the plurality of peripheral recesses included in the planar star wheel is large enough to accommodate at least one of the plurality of spherical balls; and
   d) a first port open to one section of the closed loop tunnel of oblong geometry located on one side of a hypothetical plane including the central axis of the planar star wheel and intersecting with said first and second portions of said at least a portion of the closed loop tunnel of oblong geometry, and a second port open to the other section of the closed loop tunnel of oblong geometry located on the other side of said hypothetical plane opposite to said one side.

14. An apparatus as defined in claim 13 wherein said combination includes means for measuring frequency of the plurality of spherical balls traveling across a cross section of the closed loop tunnel of oblong geometry as a measure of flow rate of fluid moving through the apparatus.

15. An apparatus as defined in claim 13 wherein said combination includes means for measuring rotating speed of the planar star wheel as a measure of flow rate of fluid moving through the apparatus.

16. An apparatus as defined in claim 13 wherein said combination includes a power shaft transmitting rotating motion from and to the planar star wheel.

17. An apparatus as defined in claim 13 wherein said combination includes another planar star wheel rotatably disposed in another planar cavity disposed at the other extremity of the portion of the body surrounded by the closed loop tunnel of oblong geometry opposite to said one extremity in a mirror image relationship to said the planar star wheel about a hypothetical plane located intermediate said the and another planar star wheel; wherein a midportion of the closed loop tunnel of oblong geometry intermediate said the and another planar cavity has circular cylindrical wall free of any crevices open to at least one of said the and another planar cavity.

18. An apparatus as defined in claim 17 wherein said combination includes means for measuring frequency of the plurality of spherical balls traveling across a cross section of the closed loop tunnel of oblong geometry as a measure of flow rate of fluid moving through the apparatus.

19. An apparatus as defined in claim 17 wherein said combination includes means for measuring rotating speed of at least one of said the and another planar star wheel as a measure of flow rate of fluid moving through the apparatus.

20. An apparatus as defined in claim 17 wherein said combination includes a power shaft transmitting rotating motion from and to at least one of said the and another planar star wheel.

* * * * *